United States Patent
Lear et al.

(10) Patent No.: US 9,802,604 B2
(45) Date of Patent: Oct. 31, 2017

(54) METHODS AND SYSTEMS FOR IMPROVING HYBRID VEHICLE EFFICIENCY

(71) Applicant: Ford Global Technologies, LLC, Dearborn, MI (US)

(72) Inventors: Christopher Alan Lear, Dearborn, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 371 days.

(21) Appl. No.: 14/286,722

(22) Filed: May 23, 2014

(65) Prior Publication Data
US 2015/0336563 A1    Nov. 26, 2015

(51) Int. Cl.
| | |
|---|---|
| *B60W 10/08* | (2006.01) |
| *B60W 10/06* | (2006.01) |
| *B60W 30/188* | (2012.01) |
| *B60W 20/00* | (2016.01) |
| *B60W 20/10* | (2016.01) |

(52) U.S. Cl.
CPC .......... *B60W 20/108* (2013.01); *B60W 10/06* (2013.01); *B60W 10/08* (2013.01); *B60W 20/10* (2013.01); *B60W 30/188* (2013.01); *B60W 2710/0605* (2013.01); *B60W 2710/0666* (2013.01); *B60W 2710/083* (2013.01); *Y02T 10/56* (2013.01); *Y02T 10/6286* (2013.01); *Y02T 10/84* (2013.01); *Y10S 903/93* (2013.01); *Y10T 477/23* (2015.01)

(58) Field of Classification Search
None
See application file for complete search history.

(56) References Cited

U.S. PATENT DOCUMENTS

| | | | |
|---|---|---|---|
| 8,288,886 B2 | 10/2012 | Anwar et al. | |
| 8,290,651 B2 | 10/2012 | Park et al. | |
| 2010/0114424 A1* | 5/2010 | Morris | B60W 30/20 701/51 |

(Continued)

OTHER PUBLICATIONS

Johri, Rajit et al., "Torque Based Energy Management in Hybrid Vehicle," U.S. Appl. No. 14/157,892, filed Jan. 17, 2014, 20 pages.

*Primary Examiner* — Colby M Hansen
(74) *Attorney, Agent, or Firm* — David Kelley; McCoy Russell LLP

(57) ABSTRACT

A method for operating a driveline of a vehicle includes adjusting operation of an electric machine to provide a torque difference between a driver demand torque and an engine output torque, when the electric machine is not operating in an operating range in which electric machine efficiency is less than a threshold efficiency. The operating range has a first, positive torque limit defining a positive extent of the operating range and a second, negative torque limit defining a negative extent of the operating range. In response to the torque difference being within the operating range and greater than zero, the torque output of the electric machine is maintained at the first torque limit, whereas in response to the torque difference being within the operating range and less than zero, the torque output of the electric machine is maintained at the second torque limit.

12 Claims, 6 Drawing Sheets

(56) References Cited

U.S. PATENT DOCUMENTS

| | | | |
|---|---|---|---|
| 2012/0190498 A1* | 7/2012 | Stoffels | B60K 6/442 477/5 |
| 2013/0103234 A1* | 4/2013 | Sah | B60W 10/08 701/22 |
| 2013/0158756 A1 | 6/2013 | Yamazaki et al. | |
| 2013/0297126 A1 | 11/2013 | Yamazaki et al. | |

* cited by examiner

METHODS AND SYSTEMS FOR IMPROVING HYBRID VEHICLE EFFICIENCY

FIELD

The present description relates to a system and methods for improving efficiency of a hybrid vehicle. The methods may be particularly useful for hybrid vehicles that include an electric motor or generator that may be selectively coupled to an engine.

BACKGROUND AND SUMMARY

A driver's torque demand may be split between an engine and an electric machine. The torque split between the electric machine and the engine may vary with operating conditions such as battery state of charge (SOC), driver torque demand, amount of hydrocarbon fuel stored in the vehicle, and other conditions. In addition, it may be desirable to operate an engine at its most fuel efficient operating conditions to reduce fuel consumption. However, if the driver demand torque is to be met and the engine is operated only at its most efficient operating conditions, operating efficiency of the electrical machine may be reduced more than is desired.

The inventors herein have recognized the above-mentioned disadvantages and have developed a method for operating a driveline, comprising: adjusting an engine to provide a torque, the torque being a portion of a driver demand torque; and adjusting an electric machine to provide an efficiency limited torque when a torque difference between the driver demand torque and the torque is in an efficiency dead-band of the electric machine.

By operating an electric machine to avoid operating conditions where efficiency of the electric machine may be reduced, the technical result of increasing operating efficiency of an electric machine may be achieved. For example, an engine operating in conjunction with the electric machine to propel a vehicle may be operated at efficient operating conditions to meet driver demand torque and improve engine efficiency. At the same time, the electric machine may be operated to avoid a dead-band operating range where electric machine efficiency may be less than is desired. In one example, the dead-band operating range may be at lower electric machine speeds and higher electric machine loads. Further, in some examples, operation of the engine may be adjusted to meet the driver demand torque during conditions where operation of the electric machine is being adjusted to avoid the dead-band operating range.

The present description may provide several advantages. For example, the approach may improve driveline efficiency. Further, the approach may conserve electrical energy for operating an electric machine to propel a vehicle. Additionally, the approach may be applied to hybrid vehicles that include gasoline, diesel, or gaseous fueled engines.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
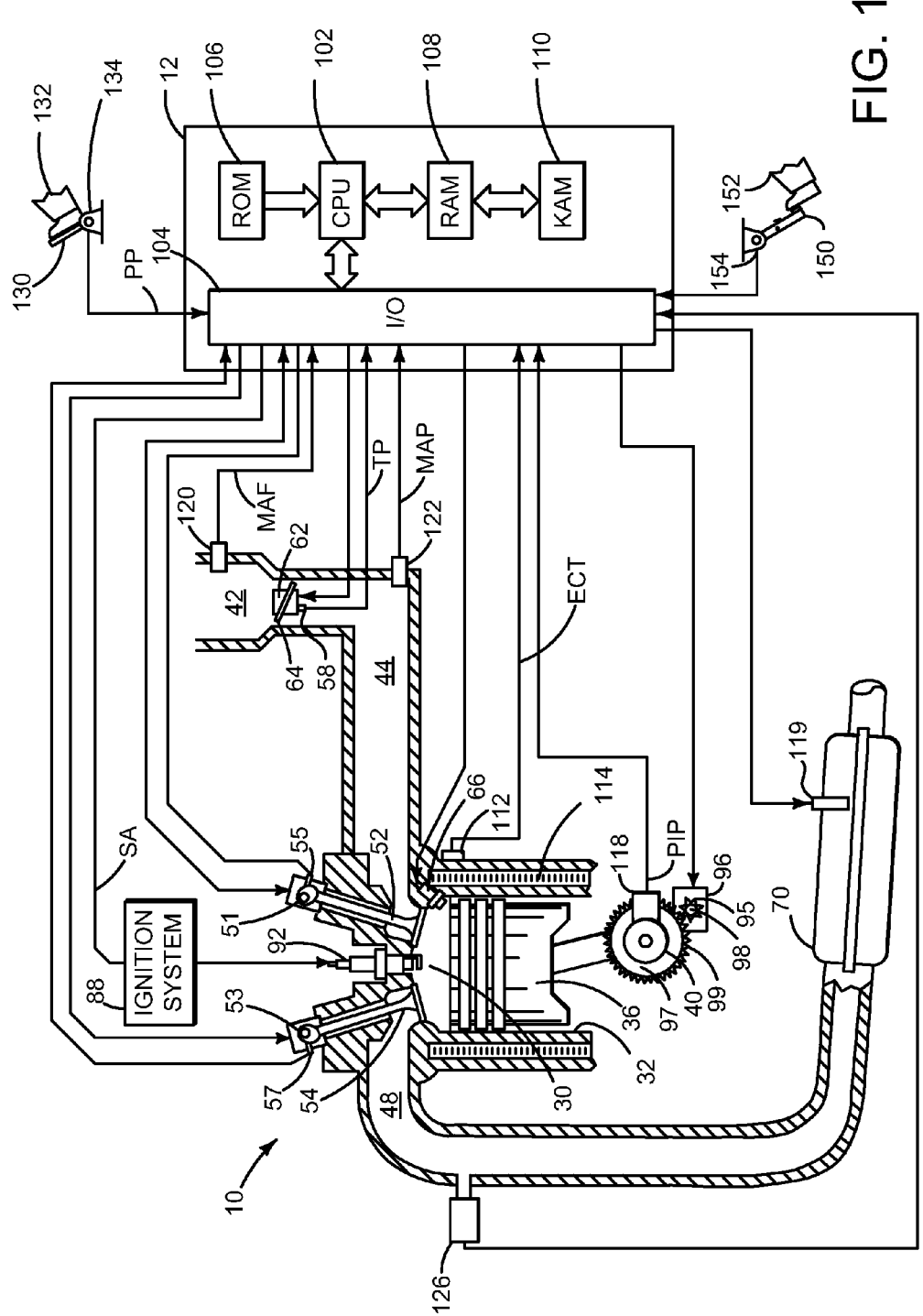
FIG. 1 is a schematic diagram of an engine.
Figure 2:
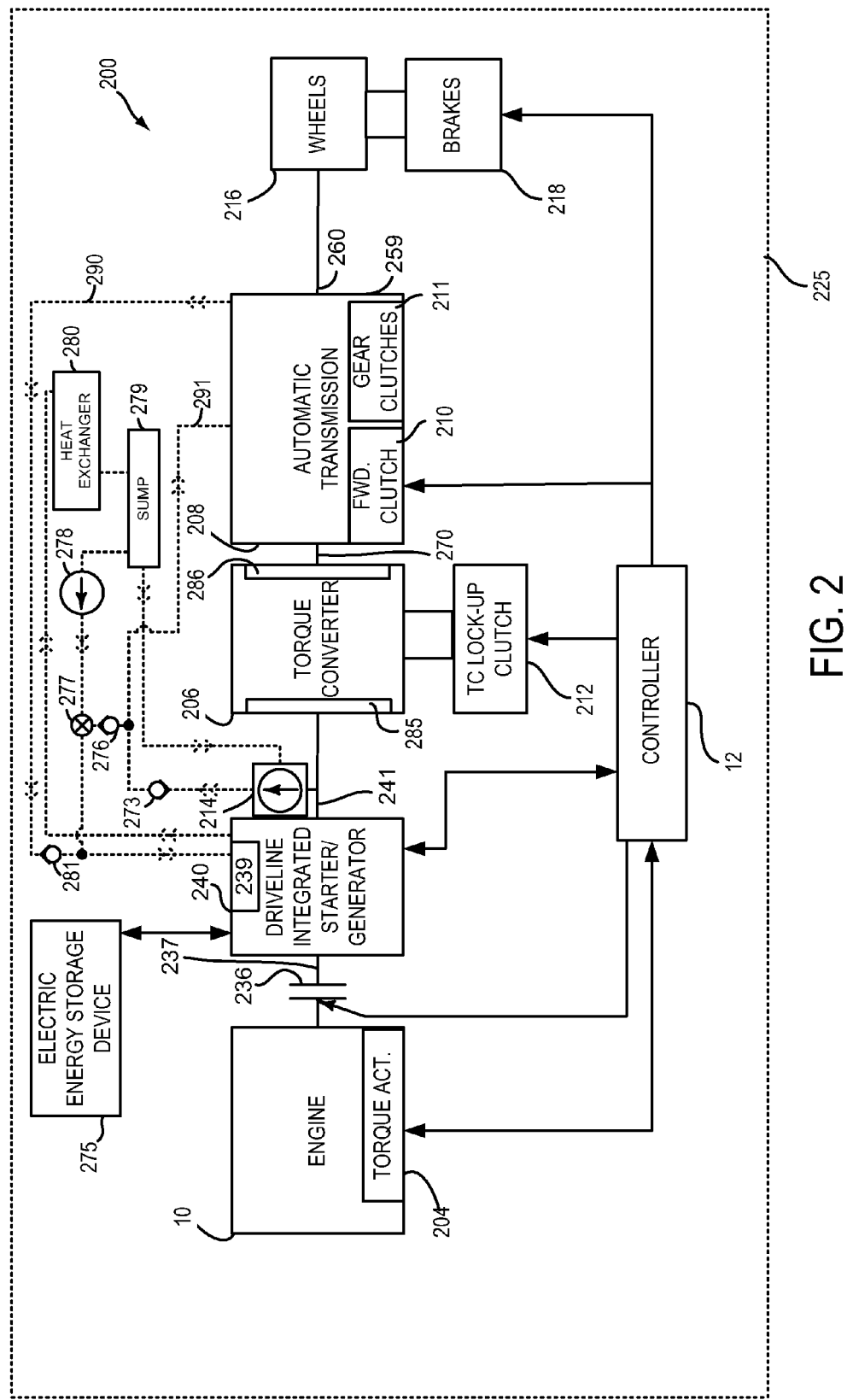
FIG. 2 shows an example vehicle driveline configuration.
Figure 3:
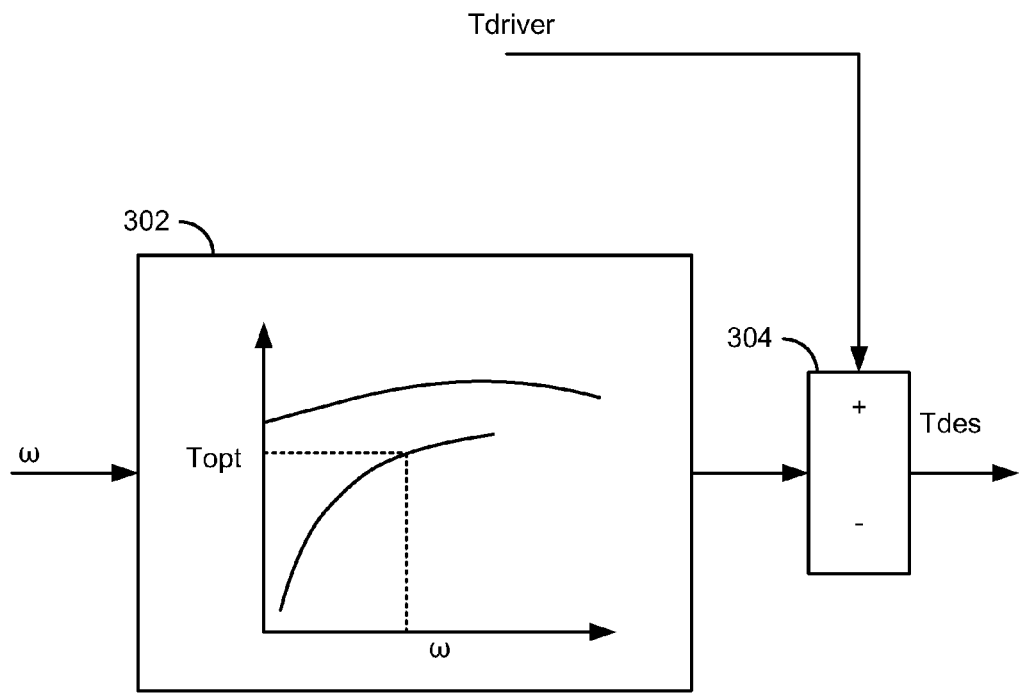
FIG. 3 shows an example way for determining engine torque and electric machine torque.
Figure 5:
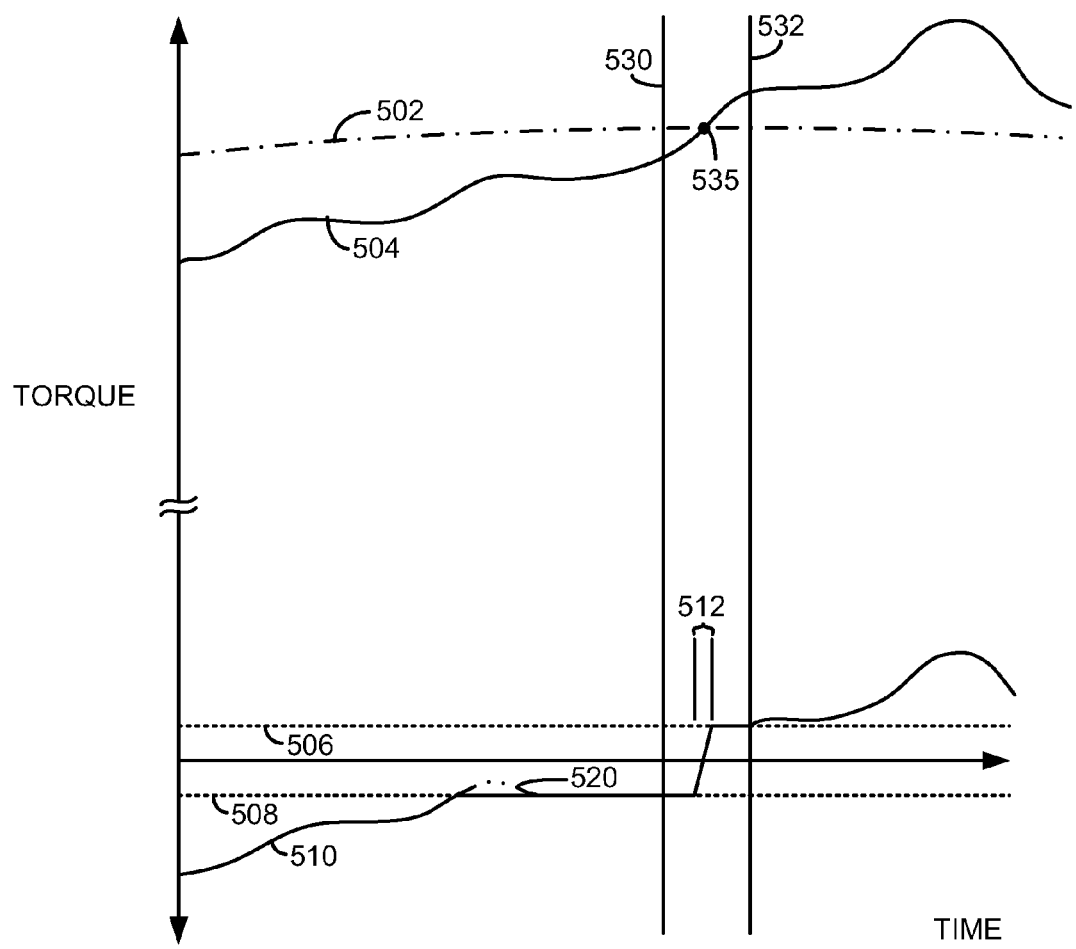
FIG. 5 is a plot showing a way to meet driver demand torque while avoiding to operate an electric machine in a less efficient operating range.

The present description is related to improving driveline efficiency of a hybrid vehicle. The driveline may include an engine as is shown in FIG. 1. The engine may be mechanically coupled to other vehicle components to form a driveline as is shown in FIG. 2. An amount of driveline torque provided by a driveline integrated starter/generator (DISG) may be determined as is shown in FIG. 3. The DISG may be operated to avoid a selected operating range where its efficiency may be less than desired. An example operating sequence where the DISG avoids operating in a less efficient operating range is shown in FIG. 5. The DISG and an engine may be operated according to the method shown in FIG. 6 to improve driveline operating efficiency.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. The driveline of FIG. 2 includes engine 10 shown in FIG. 1. Mechanical devices are shown using solid lines while hydraulic passages 290 are show as dotted lines with arrows indicating transmission fluid flow direction.

Driveline 200 may be powered by engine 10. Engine 10 may be started with an engine starting system shown in FIG. 1 or via driveline integrated starter/generator (DISG) 240. Further, torque of engine 10 may be adjusted via torque actuator 204, such as a fuel injector, throttle, etc.

An engine output torque may be transmitted to an input side of driveline disconnect clutch 236. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 and mechanical transmission pump 214 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 via passage 291 to provide hydraulic pressure to engage various clutches, such as forward clutch 210, gear clutches 211, and/or torque converter lock-up clutch 212. Mechanical oil pump 214 is also in fluid communication with DISG 240 to cool DISG armature and/or stator windings 239. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases. Mechanical oil pump 214 draws oil from sump 279. Oil is cooled via heat exchanger 280 before entering sump 279. However, in some examples, heat exchanger 280 may be positioned between mechanical pump 214 and sump 279. As shown, mechanical pump supplies oil or transmission fluid to automatic transmission 208 and the oil then flows to cool DISG 240 before being returned to sump 279 by way of heat exchanger 280.

Driveline 200 also includes electric pump 278 for supplying oil or transmission fluid to automatic transmission 208 and DISG 240 when shaft 241 is not rotating. Oil output from electric pump 278 may flow through three-way valve 277 and check valve 276 to reach passage 291 before proceeding to transmission 208 and DISG 240. Check valve 276 limits oil flow from mechanical pump 214 to electrical pump 277, and check valve 273 limits oil flow from electrical pump 277 to mechanical pump 214. Electric pump 277 draws oil or transmission fluid from sump 279.

Alternatively, electric pump 278 may supply oil or transmission fluid directly to DISG 240 by way of valve 277. Check valve 281 limits oil flow from electric pump 278 to transmission 208 when electric pump 278 supplies oil directly to DISG 240. Electric pump 278 may be activated when engine 10 and/or DISG 240 are or are not rotating. In one example, electric pump 278 supplies oil to clutches 211, thereby holding the operating states of clutches 211 to limit vehicle motion when vehicle 225 is stopped.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by cranking engine 10 and resuming cylinder combustion.

Thus, the system of FIGS. 1 and 2 provides for a driveline system, comprising: an engine; an electric machine a driveline disconnect clutch selectively coupling the engine and the electric machine; and a controller including executable instructions stored in non-transitory memory for not operating the electric machine in a dead-band based on electric machine speed and electric machine efficiency. The system further comprises additional instructions for adjusting electric machine torque to provide a torque difference between a driver demand torque and engine torque. The system further comprises additional instructions for transitioning electric machine output torque through the dead-band in response to the torque difference switching from a positive value to a negative value.

In some examples, the system further comprises additional instructions for transitioning electric machine output torque through the dead-band in response to the torque difference switching from a negative value to a positive value, and where the dead-band is an efficiency dead-band. The system includes where the driveline disconnect clutch is closed. The system further comprises additional instructions to provide a portion of a driver demand torque via the electric machine.

Referring now to FIG. 3, a block diagram for determining engine torque and electric machine torque based on driver demand torque is shown. The method illustrated in FIG. 3 may be applied in the method of FIG. 6.

Block 302 represents a function or table that outputs an empirically determined engine torque in response to an input of engine speed or angular velocity w. The engine torque output from the table or function is engine torque at the most efficient mapped engine operating conditions for the present engine speed. In one example, the torque output is based on operating conditions at the present engine speed where the engine operates most efficiently, and the engine efficiency is based on engine output work divided by the amount of fuel consumed.

The engine torque determined at 302 enters summing block 304 where the engine torque is subtracted from the driver demand torque Tdriver. The result is desired electric machine torque Tdes. The desired electric machine torque is provided to the driveline whether the difference between driver demand torque and engine torque is negative or positive. However, if the electric machine does not have the capacity to meet the driver demand torque or in not capable of providing the determined electric machine torque, engine torque may be adjusted to provide the driver demand torque.

Figure 4:
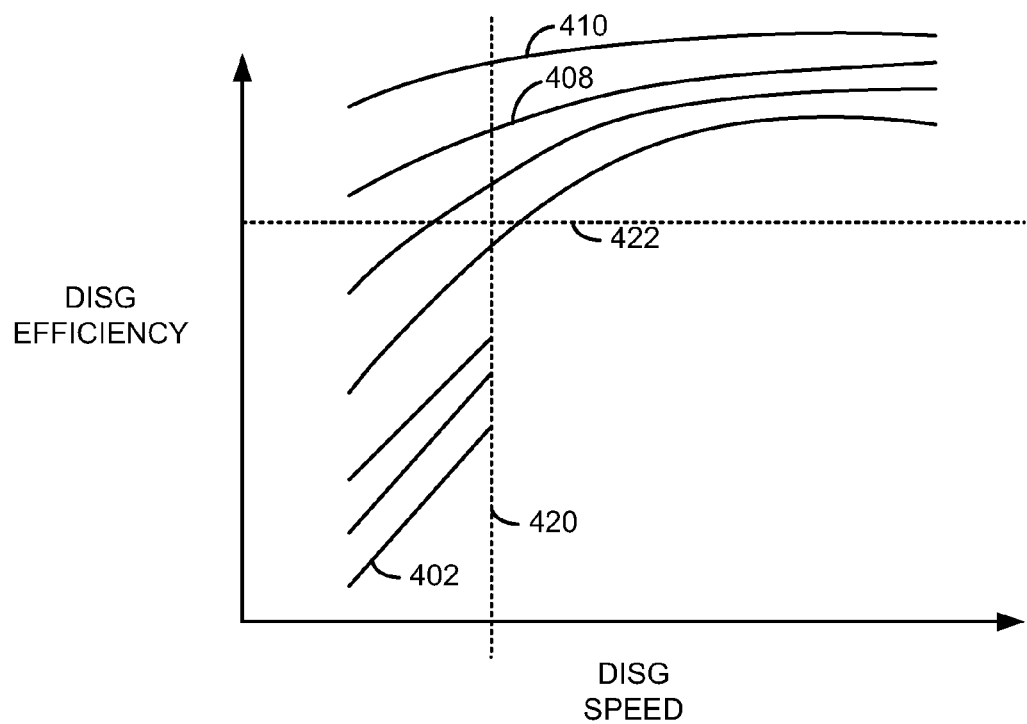
FIG. 4 is a plot showing electric machine efficiency versus speed.

Referring now to FIG. 4, a plot of electric machine efficiency versus electric machine speed is shown. The plot shows the basis for the efficiency dead-band for improving electric machine efficiency.

The X axis represents electric machine speed and the Y axis represents electric machine or DISG efficiency. A family of curves is shown and each curve represents a different electric machine torque. The torque values of the respective curves increase from curve 402 to curve 410. In this example, each of the curves representing a torque corresponds to a negative torque where the electric machine converts the vehicle's kinetic energy into electrical energy. Conditions where the electric machine torque is positive may be described by similar curves.

In this example, an efficiency dead-band may be chosen as the region to the left of vertical boundary 420. Vertical boundary 420 is a limit based on electric machine speed. Further, in some examples, the efficiency dead-band may have may include horizontal boundary 422. Horizontal boundary 422 is based on electric machine efficiency, or alternatively, it may be based on torque values of the curves represented. For example, an electric machine torque curve such as curve 408 may describe the horizontal efficiency dead-band limit. Torque curves below curve 408 and to the left of boundary 420 are within the efficiency dead-band limit, and curves including and above curve 408 are outside the efficiency dead-band limit. By avoiding operating the electric machine in the efficiency dead-band, operating efficiency of the hybrid vehicle may be improved.

Referring now to FIG. 5, a simulated plot of a way to meet driver demand torque and avoid operating an electric machine in a less efficient operating range is shown. The plot represents a sequence that may be provided by the method of FIG. 6.

Figure 6:
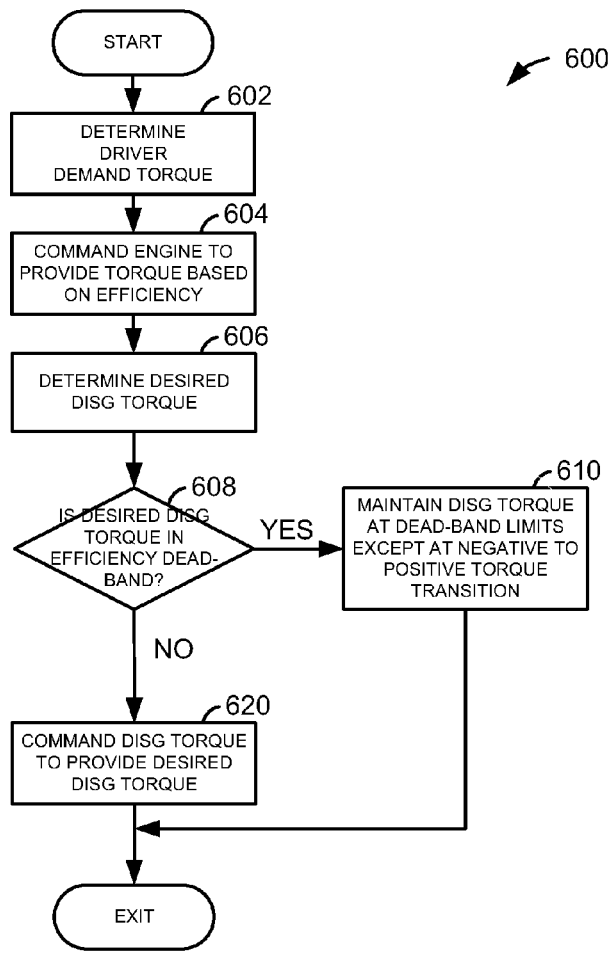
FIG. 6 is a flowchart of an example method for improving driveline operating efficiency.

The X axis represents time and time increases from the left side of FIG. 6 to the right side of FIG. 6. The Y axis represents torque and torque increases in the direction of the Y axis arrow. The double horizontal SS represent a break in the Y axis to indicate that the driver demand torque and engine torque may be much greater than the electric machine or DISG torque.

Dash-dot line curve 502 represents engine torque based on engine speed according to the method described in FIG. 3. Solid line curve 504 represents driver demand torque as determined by vehicle speed and accelerator pedal position. Solid line curve 510 represents electric machine or DISG curve based on driver demand torque and engine torque. The region between vertical marker 530 and vertical marker 532 represents a region where electric machine torque transitions from a negative torque to a positive torque based on a difference between engine torque 502 and driver demand torque 504. Region 512 represents a DISG zero torque crossing from negative torque to positive torque. Dash-dot-dot curve 520 represents best torque for lowest brake specific fuel consumption (BSFC). Horizontal line 506 represents a positive torque electric machine efficiency dead-band limit (e.g., positive efficiency torque limit), and horizontal line 508 represents a negative torque electric machine efficiency dead-band limit (e.g., negative efficiency torque limited). Thus, the dead-band extends from the electric machine torque at 508 to the electric machine torque at 506.

At the time near the Y axis, driver demand torque 504 is less than engine torque 502. Therefore, DISG torque 510 is below the X axis and negative. The DISG converts engine torque to electrical energy and supplies the electrical energy to an electric energy storage device. As time increases, driver demand torque 504 approaches engine torque 502 and DISG torque encounters efficiency dead-band limit 508. DISG torque is held at the torque efficiency dead-band limit 508 until driver demand torque 504 crosses through and is greater than engine torque at 535 (e.g., where driver demand torque intersects engine torque). DISG torque transitions from efficiency dead-band limit 508 to efficiency dead-band limit 506 in the zero crossing region 512. The DISG torque is held at the torque of efficiency dead-band limit 506 until driver demand torque 504 is greater than engine torque by the engine torque at efficiency dead-band limit 506. DISG torque increases to the right of vertical marker 532 as driver demand torque continues to increase. Thus, the method of FIG. 6 avoids operating the DISG or does not operate in the efficiency range between 508 and 506 except to cross from producing negative driveline torque to producing positive driveline torque. In this way, method 600 may limit operating in ranges where electric machine efficiency is less than desired.

Referring now to FIG. 6, a method 600 for improving hybrid driveline efficiency is shown. The method of FIG. 6 may be incorporated into the system of FIGS. 1 and 2 as executable instructions stored in non-transitory memory. Further, the method of FIG. 6 may provide the operating sequence of FIG. 5. The driveline disconnect clutch may be closed during the execution of method 600.

At 602, method 600 determined driver demand torque. In one example, driver demand torque is based on vehicle speed and accelerator pedal position. In particular, accelerator pedal position and vehicle speed are inputs into a function that outputs a driver demand torque. Method 600 proceeds to 604 after driver demand torque is determined.

At 604, method 600 commands engine torque to an engine torque where the engine operates at its highest mapped efficiency at the present engine speed (e.g., see the description of FIG. 3). In one example, the engine torque that corresponds to the highest mapped engine efficiency is stored in a look-up table that is indexed by engine speed. The look-up table outputs an engine torque and the engine is commanded to the torque via adjusting throttle position and cam timing. Method 600 proceeds to 606 after engine torque is adjusted.

At 606, method 600 determines desired electric machine or DISG torque. In one example, the desired DISG torque is the driver demand torque minus the engine torque determined at 604. Method 600 proceeds to 608 after the desired DISG torque is determined.

At 608, method 600 judges if the desired DISG torque is within the DISG efficiency dead-band. The DISG efficiency dead-band may be defined by DISG speed and DISG torque as discussed in the description of FIGS. 4 and 5. If method 600 judges that the desired DISG torque is within the electric machine efficiency dead-band at the present DISG speed, the answer is yes and method 600 proceeds to 610. Otherwise, the answer is no and method 600 proceeds to 620.

At 610, method 600 maintains or holds DISG torque at the positive or negative DISG efficiency dead-band limit torque (e.g., 506 or 508 of FIG. 5) depending on if the desired DISG torque is positive or negative. If the desired DISG torque is positive, the DISG torque is held at the torque of the positive DISG efficiency dead-band limit (e.g., 506 of FIG. 5). If the desired DISG torque is negative, the DISG torque is held at the torque of the negative DISG efficiency dead-band limit (e.g., 508 of FIG. 5). Except, if the desired DISG torque passes through zero and is increasing, the DISG torque is held at the torque of the positive DISG efficiency dead-band limit. Likewise, if the desired DISG torque passes through zero and is decreasing, the DISG torque is held at the torque of the negative DISG efficiency dead-bane limit. The DISG torque is commanded to the appropriate dead-band limit or transitions from a first dead-band limit (e.g., positive) to a second dead-band limit (e.g., negative), or vise-versa, when the DISG transitions from positive to negative torque, or vise-versa. Method 600 proceeds to exit after the DISG torque is output.

At 620, method 600 commands the DISG to provide the desired DISG torque. The DISG torque may be increased positively by increasing current flow to the DISG. The DISG torque may be increased negatively by increasing field current supplied to the DISG, or in other ways, thereby increasing negative torque generated by the DISG. Method 600 proceeds to exit after the DISG torque is commanded.

Thus, the method of FIG. 6 provides for operating a driveline, comprising: adjusting an engine to provide a torque, the torque being a portion of a driver demand torque; and adjusting an electric machine to provide an efficiency limited torque when a torque difference between the driver demand torque and the torque is in an efficiency dead-band of the electric machine. The method includes where the torque is an engine torque where the engine operates above a predetermined efficiency. The method includes where the efficiency dead-band of the electric machine is in an operating range of the electric machine where electric machine efficiency is less than a threshold efficiency.

In some examples, the method includes where the electric machine efficiency dead-band extends from a positive electric machine torque to a negative electric machine torque. The method includes where the torque is determined in response to engine speed and the driver demand torque. The method also includes where the engine is adjusted via adjusting a position of a throttle. The method includes where the electric machine provides an electric machine torque that is greater than the torque difference between the driver demand torque and the torque during a time when the torque difference is less than a range of the torque dead-band.

Additionally, the method of FIG. 6 provides for operating a driveline, comprising: adjusting an engine to provide a torque, the torque being a portion of a driver demand torque; adjusting an electric machine to provide a torque difference between the driver demand torque and the torque when the electric machine is not operating in an efficiency dead-band of the electric machine; and transitioning from a first dead-band electric machine efficiency limit to a second dead-band electric machine efficiency limit in response to the torque difference switching from negative to positive.

The method further comprises transitioning from the second dead-band electric machine efficiency limit in response to the torque difference switching from negative to positive. The method includes where the first dead-band electric machine efficiency limit is based on an efficiency of the electric machine. The method includes where the second dead-band electric machine efficiency limit is based on an efficiency of the electric machine. The method includes where the torque difference switches from negative to positive at a zero torque crossing. The method includes where the first dead-band electric efficiency limit and the second dead-band electric machine efficiency limit define extents of an electric machine efficiency dead-band. The method includes where the electric machine efficiency dead-band is based on electric machine speed.

As will be appreciated by one of ordinary skill in the art, method described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a driveline of a vehicle, the driveline comprising an engine and an electric machine, the method comprising:
adjusting a torque output of the engine in response to a driver demand torque from a driver of the vehicle;
determining a torque difference between the driver demand torque and the torque output of the engine;
determining an operating range of the electric machine, in which efficiency of a torque output of the electric machine is less than a threshold, the operating range having a first, positive torque limit defining a positive extent of the operating range and a second, negative torque limit defining a negative extent of the operating range;
in response to the torque difference being less than the second torque limit, adjusting the torque output of the electric machine to provide the torque difference between the driver demand torque and the torque output of the engine;
in response to the torque difference being greater than the first torque limit, adjusting the torque output of the electric machine to provide the torque difference between the driver demand torque and the torque output of the engine; and
in response to the torque difference being within the operating range and less than zero, maintaining the torque output of the electric machine at the second torque limit; and
in response to the torque difference being within the operating range and greater than zero, maintaining the torque output of the electric machine at the first torque limit.

2. The method of claim 1, where the torque output of the engine is an engine torque where the engine operates above a predetermined efficiency.

3. The method of claim 1, where the torque output of the engine is determined in response to engine speed and the driver demand torque.

4. The method of claim 1, where the engine is adjusted via adjusting a position of a throttle.

5. A method for operating a driveline of a vehicle, the driveline comprising an engine and an electric machine, the method comprising:
adjusting a torque output of the engine in response to a driver demand torque from a driver of the vehicle;

determining a torque difference between the driver demand torque and the torque output of the engine;

determining an operating range of the electric machine, in which efficiency of a torque output of the electric machine is less than a threshold, the operating range defined by a present speed and torque output of the electric machine and having a first, positive torque limit defining a positive extent of the operating range and a second, negative torque limit defining a negative extent of the operating range;

in response to the torque difference being less than the second torque limit, adjusting the torque output of the electric machine to provide the torque difference between the driver demand torque and the torque output of the engine;

in response to the torque difference being greater than the second torque limit and less than zero, maintaining the torque output of the electric machine at the second torque limit;

in response to the torque difference increasing from being greater than the second torque limit and less than zero to being greater than zero and less than the first torque limit, transitioning the torque output of the electric machine from the second torque limit to the first torque limit and maintaining the torque output of the electric machine at the first torque limit; and in response to the torque difference increasing above the first torque limit, adjusting the torque output of the electric machine to provide the torque difference between the driver demand torque and the torque output of the engine.

6. The method of claim 5, further comprising transitioning the torque output of the electric machine from the first torque limit to the second torque limit in response to the torque difference switching from positive to negative.

7. The method of claim 5, where the torque difference switches from negative to positive at a zero torque crossing.

8. A driveline system for an engine-driven vehicle, comprising:
an engine;
an electric machine;
a driveline disconnect clutch selectively coupling the engine and the electric machine; and
a controller including executable instructions stored in non-transitory memory for:
adjusting the engine to output a torque in response to a driver demand torque from a driver of the vehicle;
determining a torque difference between the driver demand torque and the torque output of the engine;
determining an operating range of the electric machine, in which efficiency of a torque output of the electric machine is less than a threshold, the operating range defined by a present speed and torque output of the electric machine and having a first, positive torque limit defining a positive extent of the operating range and a second, negative torque limit defining a negative extent of the operating range;
in response to the torque difference being less than the second torque limit, adjusting the torque output of the electric machine to provide the torque difference between the driver demand torque and the torque output of the engine;
in response to the torque difference being greater than the second torque limit and less than zero, maintaining the torque output of the electric machine at the second torque limit;
in response to the torque difference increasing from being greater than the second torque limit and less than zero to being greater than zero and less than the first torque limit, transitioning the torque output of the electric machine from the second torque limit to the first torque limit and maintaining the torque output of the electric machine at the first torque limit; and
in response to the torque difference increasing above the first torque limit, adjusting the torque output of the electric machine to provide the torque difference between the driver demand torque and the torque output of the engine.

9. The system of claim 8, further comprising additional instructions for transitioning the torque output of the electric machine from the first torque limit to the second torque limit in response to the torque difference switching from a positive value to a negative value.

10. The system of claim 9, further comprising additional instructions for transitioning the torque output of the electric machine from the second torque limit to the first torque limit in response to the torque difference switching from a negative value to a positive value.

11. The system of claim 8, where the driveline disconnect clutch is closed.

12. The system of claim 8, further comprising additional instructions to provide a portion of the driver demand torque via the electric machine.

* * * * *